United States Patent
Jun et al.

(10) Patent No.: US 8,045,648 B2
(45) Date of Patent: Oct. 25, 2011

(54) AMPLITUDE-SHIFT-KEYING (ASK) RADIO-FREQUENCY (RF) SIGNAL DECODING DEVICE AND METHOD THEREOF

(75) Inventors: Sang Joo Jun, Seoul (KR); Ki Yeol Kim, Gunpo-si (KR); Eui Seung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 771 days.

(21) Appl. No.: 12/123,886

(22) Filed: May 20, 2008

(65) Prior Publication Data

US 2008/0292024 A1 Nov. 27, 2008

(30) Foreign Application Priority Data

May 22, 2007 (KR) ........................ 10-2007-0049650

(51) Int. Cl.
*H03D 1/24* (2006.01)
(52) U.S. Cl. ...................................... 375/320
(58) Field of Classification Search .................. 375/354, 375/320, 316, 322, 323, 338, 359, 360, 361, 375/340; 340/572.1; 329/315, 316, 317, 329/300; 235/375, 380
See application file for complete search history.

(56) References Cited

U.S. PATENT DOCUMENTS

| | | | |
|---|---|---|---|
| 6,765,972 B1 * | 7/2004 | Kawasaki et al. ............. | 375/329 |
| 6,907,088 B1 | 6/2005 | Nakane et al. | |
| 7,392,947 B2 * | 7/2008 | Higashi ........................ | 235/449 |
| 2002/0097144 A1 * | 7/2002 | Collins et al. ................. | 340/333 |
| 2003/0123567 A1 | 7/2003 | Shigemasa et al. | |
| 2004/0076250 A1 | 4/2004 | Kim | |
| 2004/0076251 A1 | 4/2004 | Kim | |

FOREIGN PATENT DOCUMENTS

JP 2000-307465 11/2000
JP 2003-348182 12/2003

OTHER PUBLICATIONS

Stephane Meillere et al.: "13.56 MHz CMOS transceiver for RFID applications", Analog Integrated Circuits and Signal Processing, Kluwer Academic Publishers, BO, deel 49, nr.3, Sep. 25, 2006, Bladzijden 249-256, XP019432892, ISSN: 1573-1979.
Atmel Corporation: "Requirements of ISO/IEC 14443 Type B Proximity Contactless Identification Cards", Application Note Atmel, nr. Rev. 2056B-RFID-11/05, Jan. 1, 2005, bladzijden 1-28, XP007915808.

\* cited by examiner

*Primary Examiner* — Dac V. Ha
*Assistant Examiner* — Vineeta Panwalkar
(74) *Attorney, Agent, or Firm* — F. Chau & Associates, LLC

(57) ABSTRACT

An amplitude-shift-keying radio-frequency (ASK RF) signal decoding method includes separating a low frequency and a high frequency from an ASK RF signal, which includes a pause section and a non-pause section, generating a divided signal by dividing the high frequency signal, counting the divided signal for the non-pause section of the low frequency signal, and decoding the ASK RF signal based on a result of the counting.

16 Claims, 7 Drawing Sheets

LSB ... MSB

Short Frame (b) | S | b1 b2 b3 b4 b5 b6 b7 b8 | P | b1 b2 ••• b7 b8 | P | b1 b2 ••• b8 | P | E |

Standard Frame

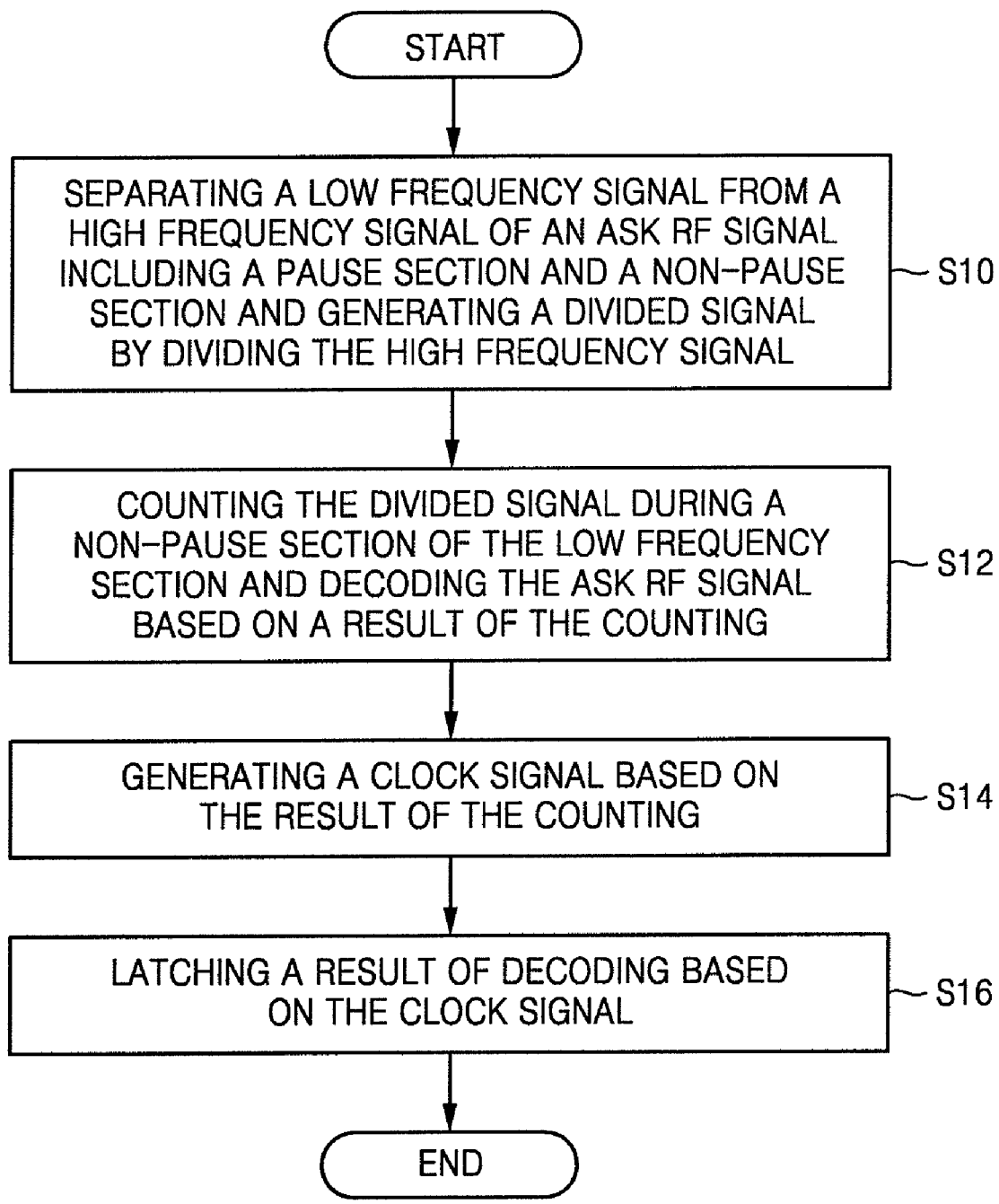

AMPLITUDE-SHIFT-KEYING (ASK) RADIO-FREQUENCY (RF) SIGNAL DECODING DEVICE AND METHOD THEREOF

CROSS-REFERENCE TO RELATED APPLICATIONS

This application claims priority under 35 U.S.C. §119 from Korean Patent Application No. 2007-0049650 filed on May 22, 2007, the disclosure of which is incorporated by reference herein.

BACKGROUND OF THE INVENTION

1. Technical Field

The present disclosure relates to amplitude-shift-keying (ASK) radio frequency (RF) signal decoding technology, and more particularly, to an ASK RF signal decoding device capable of decoding the ASK RF signal by counting a divided signal during a non-pause section of a low frequency signal, which is included in an ASK RF signal, and a method thereof.

2. Discussion of the Related Art

An integrated circuit card, also known as a smart card is widely used to conduct electronic financial transactions such as paying bus or subway fares, as a credit card, as an ID card, for paying cash by a contact-less method, or as a storage medium storing a credit card number or personal information, etc.

The integrated circuit card (IC Card) may use for communicating a standard communication protocol of a contact-less proximity IC card named ISO/IEC 14443 standard, for example. Physical characteristics and a communications protocol (a wireless frequency power and a communication signal connection, an initialization and collision prevention, etc.) of a contact-less proximity IC card are defined in the ISO/IEC 14443 standard. The ISO/IEC 14443 standard defines two types of communication signal connection methods, i.e., A-type and B-type.

FIG. 1 illustrates an example of a RF signal for an A-type interface according to the ISO/IEC 14443 standard. When connected, an amplitude shift keying ASK 100% modulation method and a correction miller code communicates wirelessly within a range of wireless frequencies between a card reader and an IC card.

In addition, as a method of transmitting data from the IC card to the card reader, a Manchester code method and an On-Off key (OOK) method may be used.

Generally, a card used in a communication signal connection mode of ISO/IEC 14443 A-type receives and transmits every bit of data by generating timing in a certain interval from an ASK RF signal received from a card reader, and when data is transmitted from an IC card to a card reader, power transmitted from a card reader to the IC card is stably supplied. However, when data is transmitted from the card reader to the IC card, there is a pause section t2 in which power supplied from a card reader to the IC card may be interrupted as illustrated in FIG. 1.

That is, since there is a section in which power supplied from a card reader to the IC card is interrupted, an ASK RF signal output from the card reader may be distorted during decoding and a clock signal generated in the IC card may include a discontinuous section.

Therefore, when an IC card generates a receiving and transmitting synchronized clock signal by dividing a clock signal including a discontinuous section, it may be difficult to maintain the bit transmission rate of the ISO/IEC 14443 A-type standard.

SUMMARY OF THE INVENTION

Accordingly, embodiments of the present invention provide an ASK RF signal decoding device capable of counting a divided signal during a non-pause section of a low frequency signal included in an ASK RF signal, and for decoding the ASK RF signal without a distortion based on a result of the counting even when an pause section is included in an ASK RF signal, and a method thereof.

Further, embodiments of the present invention provide an ASK RF signal decoding device capable of generating a successive clock signal even when a pause section is included in an ASK RF signal and a method thereof.

Accordingly, embodiments of the present invention provide an ASK RF signal decoding device capable of counting a divided signal during a non-pause section of a low frequency signal included in an ASK RF signal, and for decoding the ASK RF signal without a distortion based on a result of the counting even when a pause section is included in an ASK RF signal, and a method thereof.

The ASK RF signal decoding method may further include generating a clock signal based on the result of the counting, and latching a result of the decoding based on the clock signal. The clock signal may be generated in each transmission frame bit section corresponding to the decoded data.

The step of generating the decoded data, when a first decoding data is a first logic level, may include decoding second decoding data of the first logic level to a data output next to the first decoding data when the result of the counting is smaller than a threshold value, and decoding third decoding data of a second logic level to a data output next to the first decoding data when the result of the counting is greater than the threshold value.

The step of generating the decoded data, when a first decoding data is a first logic level, may include performing a first decoding of second decoding data of the first logic level to a data output next to the first decoding data when the result of the counting is smaller than a first threshold value, performing a second decoding of third decoding data of a second logic level to a data output next to the first decoding data when the result of the counting is greater than the first threshold value, after the second decoding, decoding fourth decoding data of the second logic level to a data output next to the third decoding data when the result of the counting is smaller than a second threshold value, and decoding fifth decoding data of the first logic level to a data output next to the third decoding data when the result of the counting is greater than the second threshold value.

According to an exemplary embodiment of the present invention, an ASK RF signal decoding device, includes a separation block separating a low frequency signal and a high frequency signal from an ASK RF signal, which includes a pause section and a non-pause section, and generating a divided signal by dividing the separated high frequency signal, and a decoding block counting the divided signal during the non-pause section of the low frequency signal and outputting a decoded data after decoding the ASK RF signal based on a result of the counting.

The separation block may include a low-pass filter detecting the low frequency signal by low-pass filtering the ASK RF signal, and a divided signal generation unit detecting the high frequency signal by high-pass filtering the ASK RF signal and generating the divided signal by dividing the detected high frequency signal.

The decoding block may include a counter counting the divided signal during the non-pause section of the low frequency signal, and a data decoder decoding the ASK RF signal based on the counting value of the counter.

The ASK RF signal decoding device may further include a clock generation unit generating a clock signal based on the counting value of the counter, and a universal asynchronous receiver/transmitter UART latching an output of the data decoder based on the clock signal.

The clock signal may be generated in each bit section of a transmission frame corresponding to the decoded data. The decoding block may decode second decoding data of the first logic level to a data output next to the first decoding data when the result of the counting is smaller than a threshold value, and decode third decoding data of a second logic level to a data output next to the first decoding data when the result of the counting is greater than the threshold value.

The decoding block may decode, when a first decoding data is a first logic level, second decoding data of the first logic level to a data output next to the first decoding data when the result of the counting is smaller than a first threshold value, and decodes a third decoding data of a second logic level to a data output next to the first decoding data when the result of the counting is greater than the first threshold value. After the second decoding, it may decode fourth decoding data of the second logic level to a data output next to the third decoding data when the result of the counting is smaller than a second threshold value, and decodes a fifth decoding data of the first logic level to a data output next to the third decoding data when the result of the counting is greater than the second threshold value.

The decoding device may be embodied in a smart card.

BRIEF DESCRIPTION OF THE DRAWINGS

Exemplary embodiments of the present invention will become apparent by reference to the following detailed description taken in conjunction with the accompanying wherein:

FIG. 3 is a data frame of an ASK RF signal input to the ASK RF signal decoding device of FIG. 2;

FIG. 7 is a flowchart illustrating an ASK RF signal decoding method according to an exemplary embodiment of the present invention.

DETAILED DESCRIPTION OF EXEMPLARY EMBODIMENTS

Figure 1:
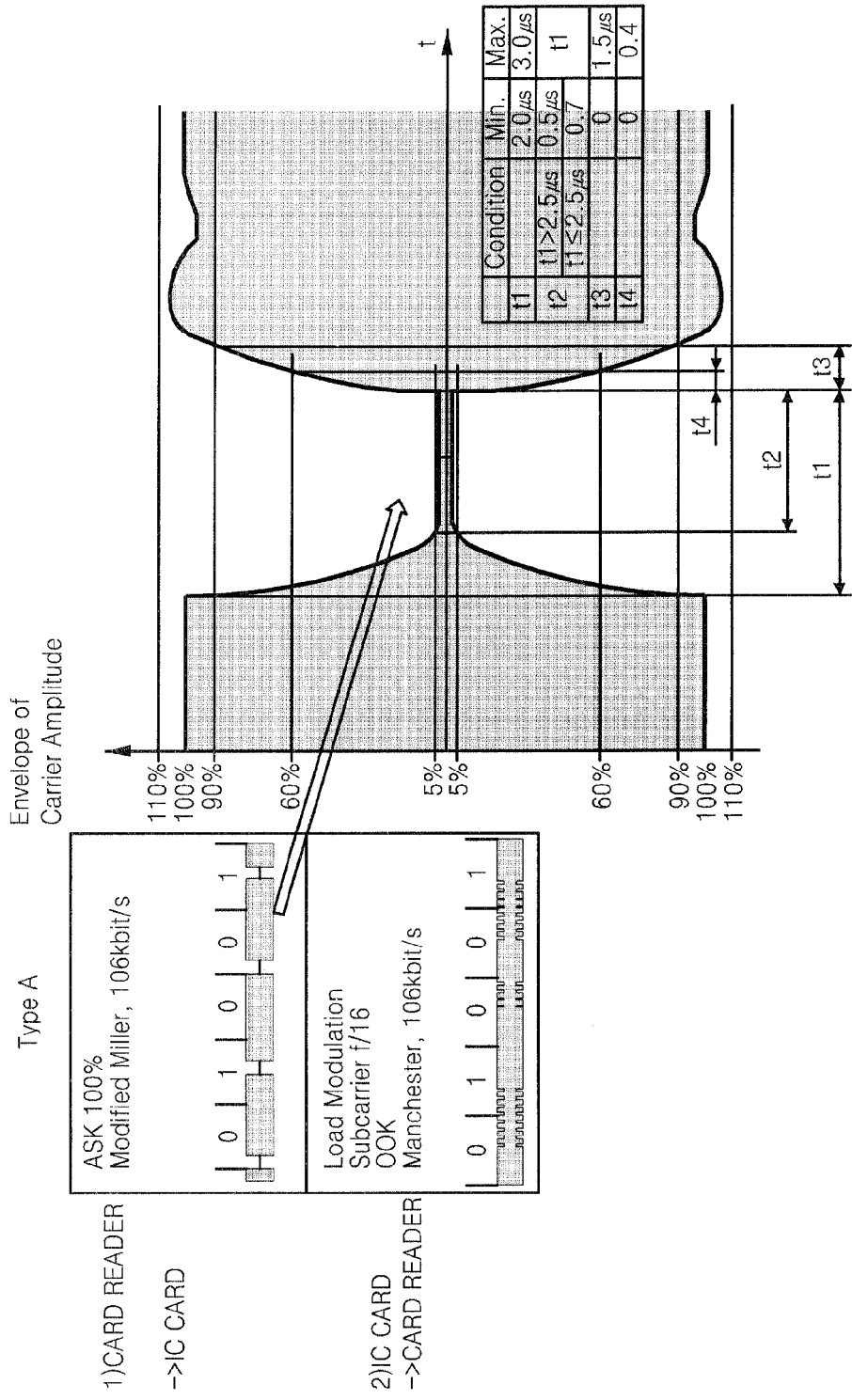
FIG. 1 is a drawing illustrating an example of a RF signal for an A-type interface of the ISO/IEC 14443 standard.

Hereinafter, exemplary embodiments of the present invention will be described in detail with reference to the accompanying drawings, wherein like reference numerals refer to the like elements throughout.

Figure 2:
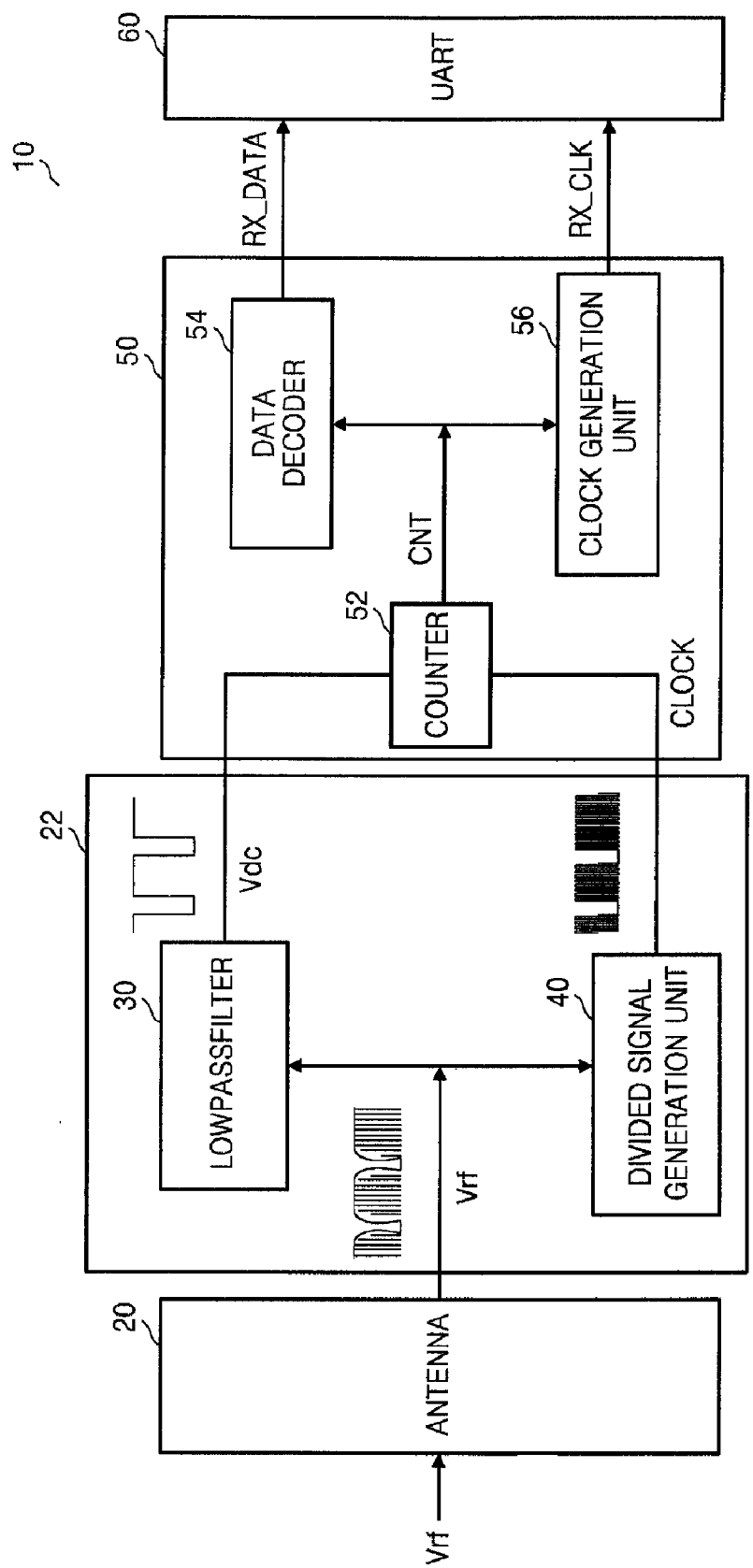
FIG. 2 is a block diagram of an ASK RF signal decoding device according to an exemplary embodiment of the present invention.

Referring to FIG. 2, an ASK RF signal decoding device 10 may include an antenna 20, a separation block 22, a decoding block 50, and a universal asynchronous receiver/transmitter UART 60. The ASK RF signal decoding device 10 may be an IC card, a smart card, or a contact-less IC card.

The antenna 20 receives and transmits an amplitude shift keying radio frequency ASK RF signal Vrf including a pause section and a non-pause section to a separation block 22. The ASK RF signal Vrf includes a pause section t2 shown in FIG. 1 and a non-pause section, and it may be a communication signal according to the ISO/IEC 14443 A-type standard.

The ASK RF signal Vrf may include a short frame such as (a) of FIG. 3. The short frame may include a start bit S, data bits b1 to b7, and an end bit E. The start bit S notifies a start of data, and the data bits b1 to b7 respectively illustrate a data included in the ASK RF signal Vrf.

Figure 4:
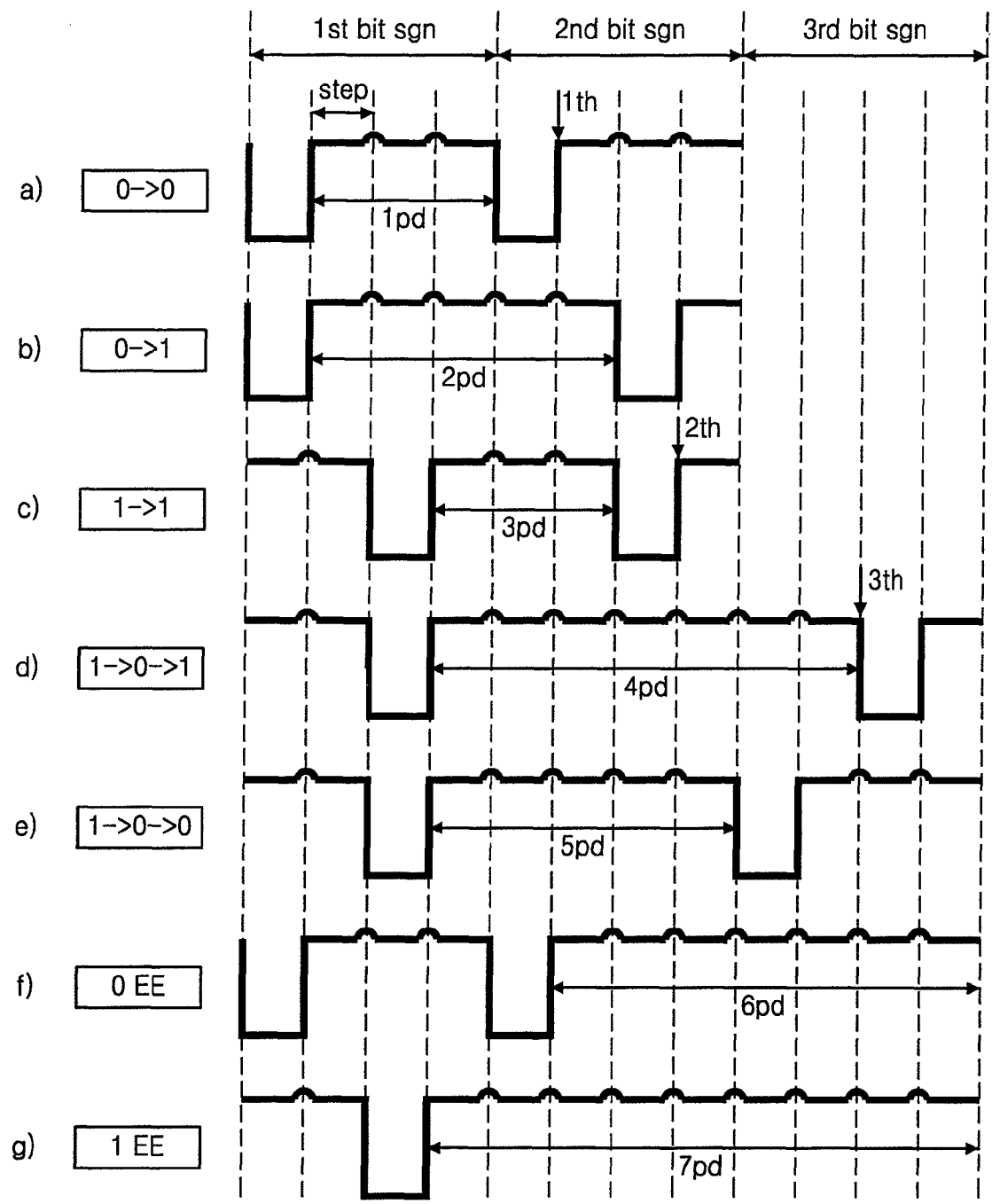
FIG. 4 illustrates ASK RF signals input to the ASK RF signal decoding device of FIG. 2.

The data bits b1 to b7 are respectively transmitted in a signal form as illustrated in FIG. 4 and a first data bit b1, a second data bit b2, and a third data bit b3 among the data bits b1 to b7 may be transmitted respectively to a first bit signal $1^{st}$ bit sgn, a second bit signal $2^{nd}$ bit sgn, and a third bit signal $3^{rd}$ bit sgn. On the other hand, the ASK RF signal Vrf may include a standard frame such as (b) of FIG. 3. The standard frame may include a start bit S, data bits b1 to b8, a parity bit P, and an end bit E.

When a period of a signal $1^{st}$ bit sgn, $2^{nd}$ big sgn, or $3^{rd}$ bit sgn corresponding to each of the data bits b1 to b7 is defined as an elementary time unit ETU, the data bits b1 to b7 may be respectively expressed by an ETU composed of M equally divided steps (an interval between lines), where M is a natural number, e.g., 4.

Referring to FIG. 2, the separation block 22 separates a low frequency signal Vdc and a high frequency signal from an ASK RF signal Vrf, which includes a pause section and a non-pause section, and generates a divided signal CLOCK by dividing a separated high frequency signal. The low-pass filter 30 detects the low frequency signal Vdc by low-pass filtering the ASK RF signal Vrf. The divided signal generation unit 40 detects the high frequency signal by high-pass filtering the ASK RF signal Vrf and generates the divided signal CLOCK by dividing a detected high frequency signal.

The divided signal generation unit 40 may include a high-pass filter (not shown) and a divider (not shown). The high-pass filter detects the high frequency signal by high-pass filtering the ASK RF signal Vrf, and the divider generates the divided signal CLOCK by dividing a high frequency signal output from the high-pass filter.

The divided signal CLOCK may be a signal selected by a selection signal (not shown) among clock signals, which have various frequencies output from the divider (not shown). The decoding block 50 counts the divided signal CLOCK during the non-pause section of the low frequency signal Vdc, and decodes the ASK RF signal Vrf based on the result of the counting CNT.

The decoding block 50 may include a counter 52, a data decoder 54, and a clock generation unit 56. The counter 52 counts an oscillation frequency or a cycle number of the divided signal CLOCK during a non-pause section of the low frequency signal Vdc. That is, the counter 52 is reset when the low frequency signal Vdc is a first logic level, e.g., a low level 0, and counts an oscillation frequency of the divided signal CLOCK when the low frequency signal Vdc is a second logic level, e.g., a high level 1.

Figure 5:
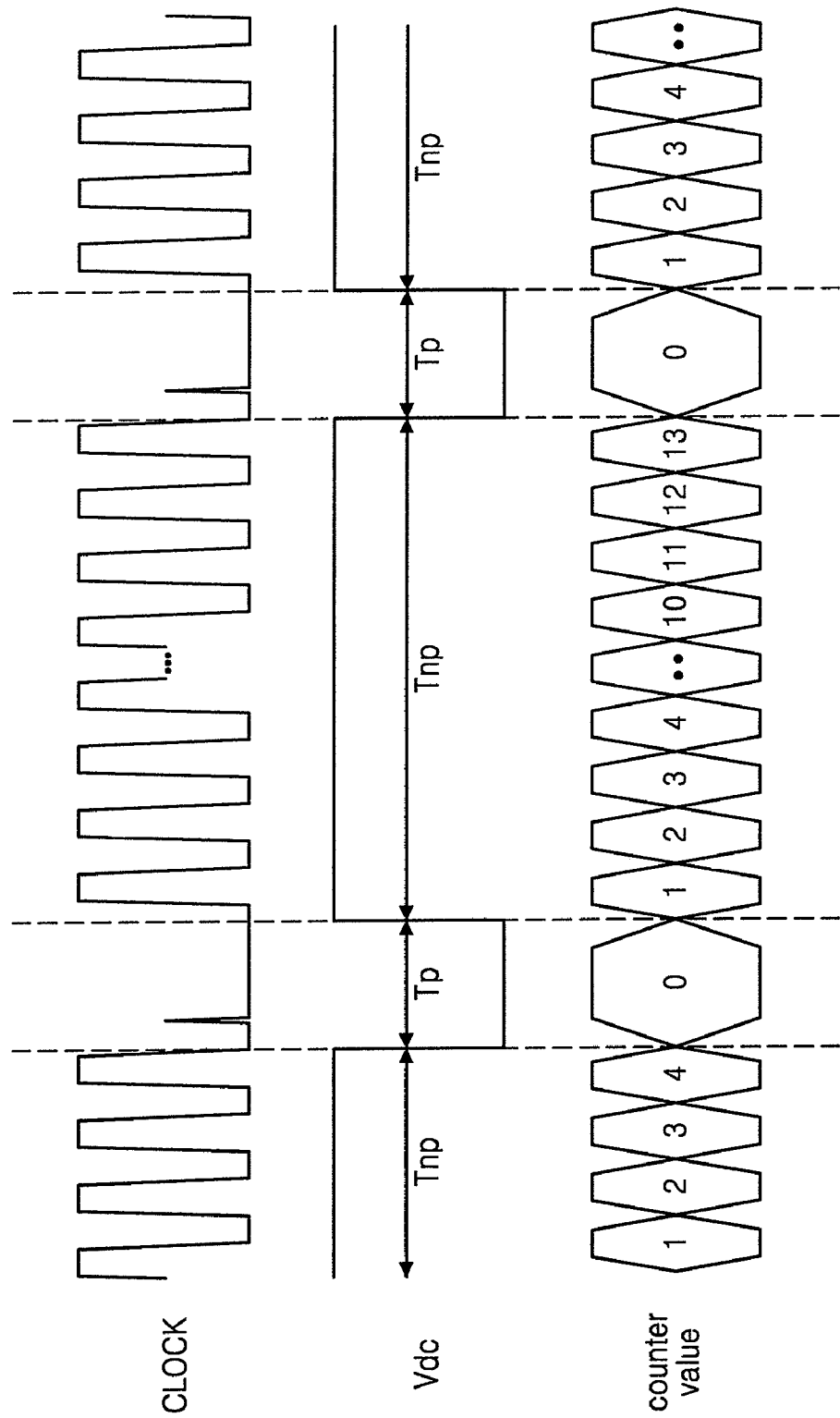
FIG. 5 is a waveform diagram explaining how a counter of FIG. 2 counts a divided signal.

For example, the counter 52 may output "4", e.g., a binary number 000100, as a counting value CNT when a divided signal CLOCK oscillates four times during a non-pause section Tnp of a low frequency signal Vdc, and output "13", e.g., a binary number 001101, as the counting value CNT when the divided signal oscillates 13 times as illustrated in FIG. 5.

The data decoder 54 decodes the ASK RF signal Vrf based on a counting value CNT of the counter 52 and outputs a decoded data RX_DATA.

Figure 6:
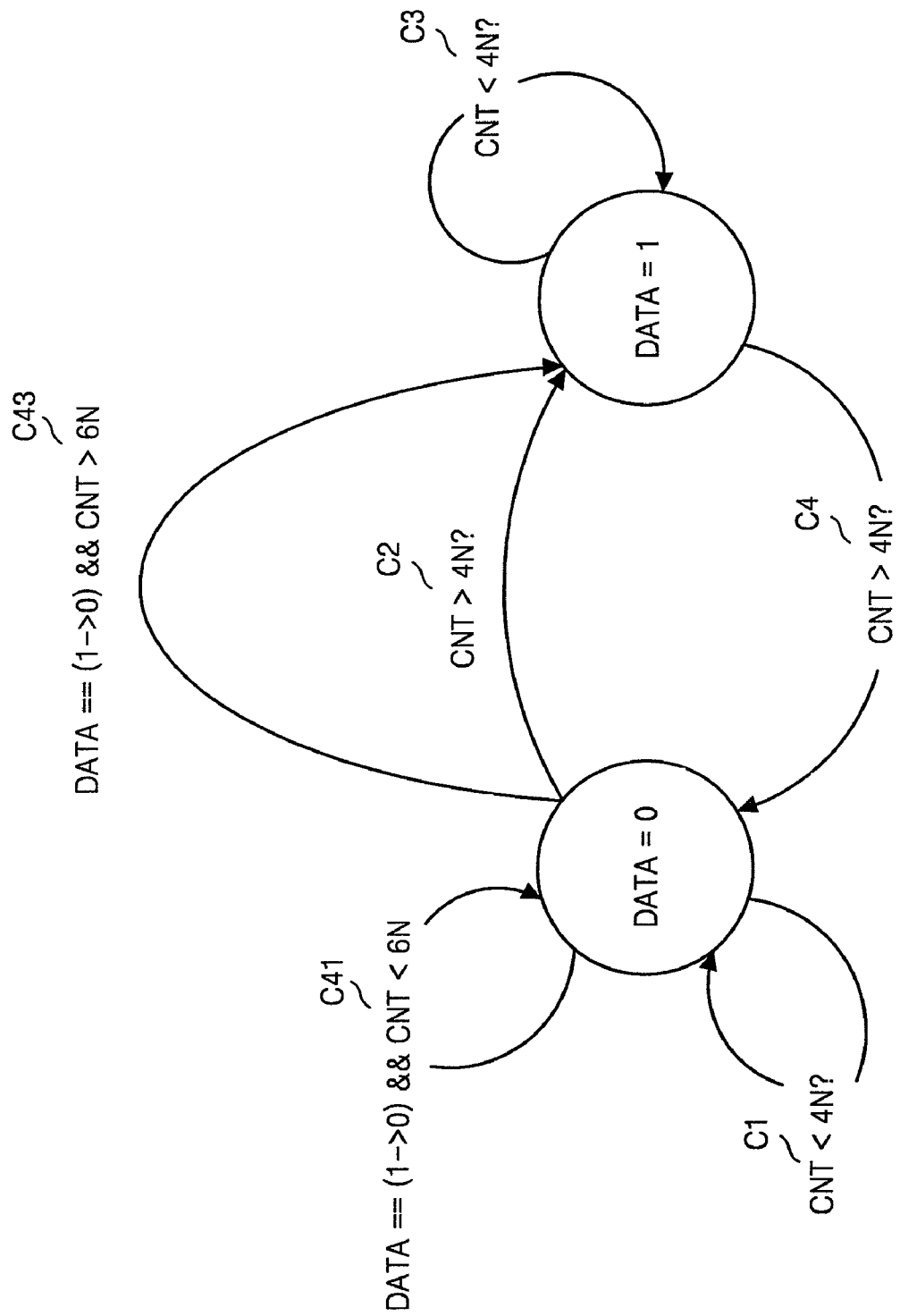
FIG. 6 is a state diagram explaining how a data recorder of FIG. 2 decodes an ASK RF signal.

The data decoder 54, when a first decoding data is a first logic level, e.g., a low level 0, may decode a second decoding data of a first logic level, e.g., a low level 0, to a data output next to the first decoding data in case that the counting value CNT is smaller than a first threshold value 4N (C1 of FIG. 6), and decode a third decoding data of a second logic level, e.g., a high level 1, to a data output next to the first decoding data in case that the counting value CNT is greater than the first threshold value (C2 of FIG. 6).

That is, the first threshold value 4N is a reference value determining a logic level of a decoding data output next to the first decoding data when the first decoding data is a first logic level, e.g., a low level 0. For example, when a first decoding data is a first logic level (e.g., a low level 0) in a and b of FIG. 4, and each of M steps, where M is a natural number, e.g., 4, composing an ETU includes N divided signals CLOCK, where N is a natural number, e.g., 4, a decoding data output next to the first decoding data may be a second decoding data of a first logic level (e.g., a low level 0) in case of a or a third decoding data of a second logic level (e.g., a high level 1) in case of b after a first decoding data of a first logic level, e.g., a low level 0 is output, Here, the value of N may be, of course, changed according to a bit rate or a data rate of a signal transmitted from a card reader (not shown) to a contact-less IC card (not shown) including the ASK RF decoding device 10.

A counting value CNT is 12 when a decoding data output next to the first decoding data is the second decoding data; that is, a counting value CNT for a first section 1pd, which is calculated by multiplying 3 (a number of steps) by 4 (a number of clocks included in one step). A counting value CNT is 20 when a decoding data output next to the first decoding data is the third decoding data; that is, a counting value CNT for a second section 2pd, which is calculated by multiplying 5 (a number of steps) by 4 (a number of clocks included in one step).

Accordingly, the first threshold value (4N=16) may be a counting value CNT from a beginning of counting, i.e., when a first section 1pd and a second section 2pd are started, until a "1th" time point. And the data decoder 54 may determine or detect if a decoding data output next to the first decoding data is a second decoding data or the third decoding data based on the first threshold value (4N=16).

Referring the FIG. 4, the data decoder 54 may output a first decoding data 0 and a second decoding data 0 as a decoded data RX_DATA such as a when a decoding data output next to a first decoding data is a second decoding data. Otherwise, the data decoder 54 may output a first decoding data 0 and a third decoding data 1 as a decoded data RX_DATA such as b when a decoding data output next to a first decoding data is a third data.

The data decoder 54, when the first decoding data is a second logic level (e.g., a high level 1) and the counting value CNT is smaller than a first threshold value 4N (C3 of FIG. 6), may perform a first decoding of a fourth decoding data of the second logic level (e.g., a high level 1) to a data output next to the first decoding data.

Also, the data decoder 54, when the first decoding data is a second logic level (e.g., a high level 1) and the counting value CNT is greater than a first threshold value 4N (C4 of FIG. 6), may perform a second decoding of a fifth decoding data of a first logic level (e.g., a low level 0) to a data output next to the first decoding data.

For example, the first threshold value 4N is a reference value determining a logic level of a decoding data output next to the first decoding data when the first decoding data is a second logic level, e.g., a high level 1.

For example, when a first decoding data in c to e of FIG. 4 is a second logic level, e.g., a high level 1, and each M step composing an ETU, where M is a natural number, e.g., 4, includes N divided signals CLOCK, where N is a natural number, e.g., 4, a decoding data output next to the first decoding data after a first decoding data of a second logic level (e.g., a high level 1) is out may be a fourth decoding data (in case of c) of a second logic level (e.g., a high level 1) or a fifth decoding data (in cases of d and e) of a first logic level (e.g., a low level 0).

A counting value CNT is 12 when a decoding data output next to the first decoding data is the fifth decoding data (i.e., a count value CNT for a third section 3pd, 3 (a number of steps)*4 (a number of clocks included in one step)=12), and a counting value CNT is 28 when a decoding data output next to the first decoding data is the fifth decoding data; that is, a counting value CNT for a fourth section 4pd, 7 (a number of steps)*4 (a number of clocks included in one step)=28.

Accordingly, the first threshold value 4N=16 may be a counting value CNT from when counting is started (i.e., when a second section 2pd and a third section 3pd are started) until a timing point of 2th, and the data decoder 54 may determine or detect if a decoding data output next to the first decoding data is a fourth decoding data or the fifth decoding data based on the first threshold value 4N=16.

The data decoder 54 may output a first decoding data 1 and a fourth decoding data 1 as a decoded data RX_DATA as c when a decoding data output next to a first decoding data is a fourth decoding data. Otherwise, the data decoder 54 may output a first decoding data 1 and a second decoding data 0 as a decoded data RX_DATA like d and e when a decoding data output next to a first decoding data is a fifth decoding data.

The data decoder 54, after the second decoding, may decode a sixth decoding data of the first logic level, e.g., a low level 0, to a data output next to the fifth decoding data when the counting value CNT is smaller than a second threshold value 6N (C41 of FIG. 6).

Otherwise, the data decoder 54, after the second decoding, may decode a seventh decoding data of the second logic level, e.g., a high level 1, to a data output next to the fifth decoding data when the counting value CNT is greater than a second threshold value 6N (C43 of FIG. 6). That is, the second threshold value 6N is a reference value determining a logic level of a decoding data output next to the fifth decoding data.

For example, when a fifth decoding data in d and e of FIG. 4 is a first logic level (e.g., a low level 0) and every step composing an ETU includes N divided signals, where n is a natural number, e.g., 4, a decoding data, which is output next to the fifth decoding data after the fifth decoding data is output, may be a sixth decoding data (in case of d) of a second logic level (e.g., a high level 1) or a seventh decoding data (in case of e) of a first logic level (e.g., a low level 0).

When a decoding data output next to the fifth decoding data is the six decoding data, a counting value CNT is 28; that is a counting value CNT for a fourth section 4pd, 7 (a number of steps)*4 (a number of clocks included in one step)=28. When a decoding data output next to the fifth decoding data is the seventh decoding data, a count value CNT is 20; that is a counting value CNT for a fifth section 5pd, 5 (a number of steps)*4 (a number of clocks included in one step)=20.

Accordingly, the second threshold value 6N=24 may be a counting value CNT from when counting is started, i.e., a fourth section 4pd and a fifth section 5pd are started, until a timing point of 3th, and the data decoder 54 may determine or detect if a decoding data output next to the fifth decoding data is a sixth decoding data or the seventh decoding data based on the second threshold value 6N=24.

The data decoder 54 may ultimately output a first decoding data 1, a fifth decoding data 0, and a fourth decoding data 1 as a decoded data RX_DATA such as d when a decoding data output next to a fifth decoding data is a sixth decoding data. Otherwise, the data decoder 54 may ultimately output a first decoding data 1, a fifth decoding data 0, and a seventh decoding data 0 as a decoded data RX_DATA such as e when a decoding data output next to a fifth decoding data is a seventh decoding data.

The data decoder 54, when a first decoding data is a first logic level (e.g., a low level 0) and the counting value CNT is greater than a fourth threshold value, may conclude data decoding of an ASK RF signal Vrf. Decoding a data of an ASK RF signal Vrf is terminated by an end bit E among data frame of an ASK RF signal of FIG. 2. The fourth threshold value is a reference value determining if data decoding is finished by the end bit E after the first decoding data is decoded to a first logic level, e.g., a low level 0.

For example, when a first decoding data in f of FIG. 4 is a first logic level (e.g., a low level 0) and every M step composing an ETU, where M is a natural number, e.g., 4, includes N divided signals CLOCK, where N is a natural number, e.g., 4, the data decoder 54 may terminate decoding data in case that a counting value CNT for a sixth section 6pd is greater than a fourth threshold value, e.g., 36.

Also, the data decoder 54 may terminate data decoding of an ASK RF signal Vrf when a first decoding data is a second logic level (e.g., a high level 1) and the counting value CNT is greater than a fourth threshold value. Data-decoding of an ASK RF signal Vrf is terminated by an end bit E among data frame of an ASK RF signal Vrf of FIG. 2. The fourth threshold value is a reference value determining if data decoding is finished by the end bit E after the first decoding data is decoded to a second logic level, e.g., a high level 1.

For example, when a first decoding data in f of FIG. 4 is a second logic level (e.g., a high level 1) and an ETU equally divided with M steps, where M is a natural number, e.g., 4, includes N divided signals CLOCK, the data decoder 54 may terminate data decoding in case that a counting value CNT for a seventh section 7pd is greater than a fourth threshold value, e.g., 36.

According to an exemplary embodiment of the present invention, an ASK RF data decoding device 10 counts a divided signal CLOCK for a non-pause section of a low frequency signal Vdc and decodes the ASK RF signal Vrf based on a result of the counting CNT, even though power, which is supplied from a card reader (not shown) to an IC card (not shown) including the ASK RF data decoding device 10, is stopped by a pause section (t2 of FIG. 1) included in an ASK RF signal Vrf. Accordingly, the ASK RF signal Vrf may be decoded stably regardless of the pause section (t2 of FIG. 1).

The clock generation unit 56 generates a clock signal RX_CLK based on a counting value CNT of the counter 52. Preferably, the clock generation unit 56 may be generated in each bit section S, b1 to b8, P, or E of transmission frame corresponding to an ASK RF signal Vrf, which is decoded based on a counting value CNT.

The clock signal RX_CLK is a signal for latching data RX_DATA decoded in the universal asynchronous receiver/transmitter UART 60. Accordingly, the clock generation unit 56 may generate a clock signal RX_CLK, which is reversed every predetermined counting value CNT, for latching the decoded data RX_DATA.

For example, when a first decoding data in f of FIG. 4 is a first logic level (e.g., a low level 0) and M steps composing an ETU, where M is a natural number, e.g., 4, respectively include N divided signals CLOCK, where n is a natural number, e.g., 4, the clock generation unit 56 may set an offset with Q smaller than the 4, where Q is a natural number, e.g., 2, and generate a clock signal RX_CLK, which is reversed every Q (e.g., 2), Q+2N (e.g., 10), Q+4N (e.g., 18), or Q+6N (e.g., 26).

According to an exemplary embodiment of the present invention, an ASK RF data decoding device 10 may count a divided signal CLOCK during a non-pause section of a low frequency signal Vdc and generate a fixed clock signal RX_CLK based on a result of the counting CNT, even though power, which is supplied from a card reader to an IC card (not shown) including the ASK RF data decoding device 10, is stopped by a pause section (t2 of FIG. 1) included in an ASK RF signal Vrf.

The UART 60 latches a data RX_DATA decoded by the data decoder 50 based on the clock signal RX_CLK. The UART 60 may, of course, include a flip-flop (not shown) or a latch circuit (not shown) for latching a data RX_DATA decoded by the data decoder based on the clock signal RX_CLK.

FIG. 7 is a flowchart illustrating an ASK RF signal decoding method according to an exemplary embodiment of the present invention. Referring to FIGS. 2 and 7, a separation block including a low-pass filter 30 and a divided signal generation unit 40 separates a low frequency signal Vdc and a high frequency signal in an ASK RF signal Vrf, which includes a pause section and a non-pause section, and generates a divided signal CLOCK by dividing the high frequency signal (S10). A counter 52 counts the divided signal CLOCK during the non-pause section of the low frequency signal Vdc and a data decoder 54 decodes the ASK RF signal Vrf based on a result of the counting CNT (S12).

A clock generation unit 56 generates a clock signal RX_CLK based on the result of the counting CNT (S14). An UART 60 latches a decoding result RX_DATA of the (S12) based on the clock signal RX_CLK (S16).

As described above, an ASK RF signal decoding device and a method thereof according to exemplary embodiments of the present invention may decode the ASK RF signal stably by counting a divided signal for a non-pause section of a low frequency signal included in an ASK RF signal, and decoding the ASK RF signal based on a result of the counting even when a pause section is included in the ASK RF signal.

Further, the ASK RF signal decoding device and the method thereof according to exemplary embodiments of the present invention may generate a successive clock signal even when an ASK RF signal includes a pause section.

Although exemplary embodiments of the present invention have been shown and described for illustrative purposes, it will be appreciated by those skilled in the art that changes may be made in these embodiments, without departing from the scope and spirit of the disclosure.

What is claimed is:

1. An amplitude-shift-keying radio frequency (ASK RF) signal decoding method, comprising:
   separating a low frequency signal and a high frequency signal from the ASK RF signal including a pause section and a non-pause section;
   generating a divided signal by dividing the high frequency signal;
   counting the divided signal for the non-pause section of the low frequency signal;
   decoding the ASK RF signal based on a result of the counting; and
   generating decoded data, wherein when first decoding data is a first logic level, the step of generating the decoded data comprises:
   decoding second decoding data of the first logic level as data output next to the first decoding data when the result of the counting is smaller than a threshold value; and
   decoding third decoding data of a second logic level as the data output next to the first decoding data when the result of the counting is greater than the threshold value.

2. The method of claim 1, further comprising:
   generating a clock signal based on the result of the counting; and
   latching a result of the decoding based on the clock signal.

3. The method of claim 2, wherein the clock signal is generated in each bit section of a transmission frame corresponding to the decoded data.

4. An amplitude-shift-keying radio frequency (ASK RF) signal decoding method, comprising:

separating a low frequency signal and a high frequency signal from the ASK RF signal including a pause section and a non-pause section;

generating a divided signal by dividing the high frequency signal; counting the divided signal for the non-pause section of the low frequency signal;

decoding the ASK RF signal based on a result of the counting; and generating decoded data, wherein, when first decoding data is a first logic level, the step of generating the decoded data comprises:

performing a first decoding of second decoding data of the first logic level as data output next to the first decoding data when the result of the counting is smaller than a first threshold value;

performing second decoding of third decoding data of a second logic level as data output next to the first decoding data when the result of the counting is greater than the first threshold value;

decoding fourth decoding data of the second logic level as data output next to the third decoding data when the result of the counting is smaller than a second threshold value; and decoding fifth decoding data of the first logic level as data output next to the third decoding data when the result of the counting is greater than the second threshold value.

5. An amplitude-shift-keying radio frequency (ASK RF) signal decoding device, comprising:

a separation block separating a low frequency signal and a high frequency signal from the ASK RF signal including a pause section and a non-pause section, and generating a divided signal by dividing the separated high frequency signal; and a decoding block counting the divided signal for the non-pause section of the low frequency signal, decoding the ASK RF signal based on a result of the counting, and outputting decoded data, wherein the decoding block decodes second decoding data of the first logic level as data output next to the first decoding data when the result of the counting is smaller than a threshold value, and decodes third decoding data of a second logic level as data output next to the first decoding data when the result of the counting is greater than the threshold value.

6. The ASK RF signal decoding device of claim 5, wherein the separation block comprises:

a low-pass filter detecting the low frequency signal by low-pass filtering the ASK RF signal; and a divided signal generation unit detecting the high frequency signal by high-pass filtering the ASK RF signal and generating the divided signal by dividing the detected high frequency signal.

7. The ASK RF signal decoding device of claim 5, wherein the decoding block comprises:

a counter counting the divided signal for the non-pause section of the low frequency signal; and a data decoder decoding the ASK RF signal based on a counting value of the counter.

8. The ASK RF signal decoding device of claim 7, further comprising:

a clock generation unit generating a clock signal based on a counting value of the counter; and a universal asynchronous receiver/transmitter (UART) latching an output of the data decoder based on the clock signal.

9. The ASK RF signal decoding device of claim 8, wherein the clock signal is generated in each bit section of a transmission frame corresponding to the decoded data.

10. The ASK RF signal decoding device of claim 5, wherein the decoding device is embodied in a smart card.

11. The ASK RF signal decoding device of claim 5, wherein the decoding device is embodied in a contactless card.

12. An amplitude-shift-keying radio frequency (ASK RF) signal decoding device, comprising:

a separation block separating a low frequency signal and a high frequency signal from the ASK RF signal including a pause section and a non-pause section, and generating a divided signal by dividing the separated high frequency signal; and a decoding block counting the divided signal for the non-pause section of the low frequency signal, decoding the ASK RF signal based on a result of the counting, and outputting decoded data, wherein, when first decoding data is a first logic level, the decoding block performs a first decoding of second decoding data of the first logic level as data output next to the first decoding data when the result of the counting is smaller than a first threshold value;

performs a second decoding of third decoding data of a second logic level as data output next to the first decoding data when the result of the counting is greater than the first threshold value;

decodes fourth decoding data of the second logic level as data output next to the third decoding data when the result of the counting is smaller than a second threshold value; and decoding fifth decoding data of the first logic level as data output next to the third decoding data when the result of the counting is greater than the second threshold value.

13. An amplitude-shift-keying radio frequency (ASK RF) signal decoding method, comprising:

separating a low frequency signal from a high frequency signal of the ASK RF signal including a pause section and a non-pause section, and generating a divided signal by dividing the high frequency signal; and counting the divided signal during the non-pause section and decoding the ASK RF signal based on a result of the counting, wherein when first decoding data is a first logic level, decoding the ASK RF signal comprises:

decoding second decoding data of the first logic level as data output next to the first decoding data when the result of the counting is smaller than a threshold value; and decoding third decoding data of a second logic level as the data output next to the first decoding data when the result of the counting is greater than the threshold value.

14. The method of claim 13, wherein a clock signal is generated based on the result of the counting.

15. The method of claim 13, wherein the ASK RF signal is a short frame including a start bit, data bits, and an end bit.

16. The method of claim 13, wherein the ASK RF signal is a standard frame including a start bit, data bits, a parity bit, and an end bit.

* * * * *